US010116430B1

(12) United States Patent
Jones

(10) Patent No.: US 10,116,430 B1
(45) Date of Patent: Oct. 30, 2018

(54) ALIGNMENT MARKER INDEPENDENT DATA ALIGNMENT FOR A RECEIVER

(71) Applicant: Xilinx, Inc., San Jose, CA (US)

(72) Inventor: Ben J. Jones, Edinburgh (GB)

(73) Assignee: XILINX, INC., San Jose, CA (US)

( * ) Notice: Subject to any disclaimer, the term of this patent is extended or adjusted under 35 U.S.C. 154(b) by 96 days.

(21) Appl. No.: 15/254,895

(22) Filed: Sep. 1, 2016

(51) Int. Cl.
  H04L 7/00 (2006.01)
  H04L 1/00 (2006.01)

(52) U.S. Cl.
  CPC .......... H04L 7/0041 (2013.01); H04L 1/0045 (2013.01); H04L 1/0057 (2013.01); H04L 7/0054 (2013.01)

(58) Field of Classification Search
  None
  See application file for complete search history.

(56) References Cited

U.S. PATENT DOCUMENTS

| | | | | | |
|---|---|---|---|---|---|
| 4,354,269 | A * | 10/1982 | Vries | ..................... | H03M 13/23 714/788 |
| 4,468,770 | A * | 8/1984 | Metcalf | ................. | H04L 1/0057 375/362 |
| 6,941,503 | B1 * | 9/2005 | Homberg | .............. | H03M 13/47 714/755 |
| 7,020,209 | B1 * | 3/2006 | Okumura | .............. | H04L 1/0002 375/253 |
| 7,298,806 | B1 * | 11/2007 | Varma | ................... | H04L 7/0062 375/354 |
| 9,628,222 | B2 * | 4/2017 | Murakami | ................ | H04L 1/08 |
| 9,807,690 | B2 * | 10/2017 | Rudolf | .............. | H04W 52/0225 |
| 2001/0008001 | A1 * | 7/2001 | Suemura | ........... | H04L 25/03866 710/316 |
| 2006/0236211 | A1 * | 10/2006 | Shieh | ..................... | H03M 13/09 714/781 |
| 2011/0047432 | A1 * | 2/2011 | Kim | ................... | H03M 13/1102 714/752 |
| 2012/0027122 | A1 * | 2/2012 | Belotserkovsky | .... | H04L 1/0042 375/295 |
| 2013/0055039 | A1 * | 2/2013 | Dearth | .................... | G06F 7/584 714/720 |

OTHER PUBLICATIONS

U.S. Appl. No. 15/199,825, Jones, Ben J., filed Jun. 30, 2016, Xilinx, Inc., San Jose, CA USA.
"Fibre Channnel Framing and Signaling-4", INCITS working draft proposed American National Standard for Information Technology, T11/15-253v2, Project T11/2238-D Rev 1.40, Oct. 7, 2015, 463 pp., American National Standards Institute, Inc. New York, NY USA.

* cited by examiner

Primary Examiner — Faruk Hamza
Assistant Examiner — Cassandra L Decker
(74) Attorney, Agent, or Firm — W. Eric Webostad; Robert M. Brush

(57) ABSTRACT

An apparatus and method therefor for a receiver are disclosed. In this apparatus, at least one delay line is configured to receive input data from a communication lane and provide repetitions of the input data delayed with respect to one another. An exclusive disjunction combinatorial circuit is configured to receive the input data and the repetitions thereof and to generate a discontinuity-detection signal for codeword alignment responsive to successive linear combination by exclusive disjunction of the input data and the repetitions thereof to cancel out portions of repeated sequences of the input data for detection of at least one type of discontinuity in the input data.

19 Claims, 8 Drawing Sheets

ALIGNMENT MARKER INDEPENDENT DATA ALIGNMENT FOR A RECEIVER

FIELD OF THE INVENTION

The following description relates to integrated circuit devices ("ICs"). More particularly, the following description relates to alignment marker independent data alignment for a receiver of an IC.

BACKGROUND

In communication, alignment markers may be placed in a communication for indicating where a message begins and/or ends, such as in Fibre Channel framing and signaling, additional details of which may be found in "Fibre Channel Framing and Signaling—4", T11/15-253v2 working draft ("Working Draft") proposed by the American National Standard for Information Technology of Accredited Standards Committee INCITS. In addition to added complexity, addition of alignment markers in a transmission adds overhead with respect to reduction of transmission bandwidth available for payload and/or higher layers in a protocol stack, as such alignment markers are generally not used at one or more layers above a physical layer interface level.

SUMMARY

An apparatus relates generally to a receiver. In such an apparatus, at least one delay line is configured to receive input data from a communication lane and provide repetitions of the input data delayed with respect to one another. An exclusive disjunction combinatorial circuit is configured to receive the input data and the repetitions thereof and to generate a discontinuity-detection signal for codeword alignment responsive to successive linear combination by exclusive disjunction of the input data and the repetitions thereof to cancel out portions of repeated sequences of the input data for detection of at least one type of discontinuity in the input data.

A system relates generally to a receiver. In such a system, at least one delay line is configured to receive input data from a communication lane and provide repetitions of the input data delayed with respect to one another. An exclusive disjunction combinatorial circuit is configured to receive the input data and the repetitions thereof and to generate a discontinuity-detection signal for codeword alignment responsive to successive linear combination by exclusive disjunction of the input data and the repetitions thereof to cancel out portions of repeated sequences of the input data for detection of at least one type of discontinuity in the input data. A checker circuit is configured to receive the discontinuity-detection signal, to check the at least one type of discontinuity between the repeated sequences of the input data responsive to the discontinuity-detection signal, and to assert a discontinuity-detected signal responsive to indication of presence of the at least one type of discontinuity. A data buffer is configured to receive and buffer the input data to provide the input data to the at least one delay line. A control circuit is configured to receive the discontinuity-detected signal and to assert a shift control signal and a suspend signal responsive to the discontinuity-detected signal. A shifter circuit is configured to receive the input data and the shift control signal and to shift the input data responsive to the shift control signal to provide shifted data. A correlator circuit is configured to receive and correlate the shifted data with a data pattern.

A method relates generally to a receiver. In such a method, obtained is input data having a training pattern including sequences formed of original data of repeated word blocks patterned with a polynomial function to provide codewords corresponding to the sequences with at least one type of discontinuity between the sequences. A first linear combination and a second linear combination are generated responsive to the input data for cancelling out effects of the polynomial function and cancelling out portions of one another to delineate presence of the at least one type of discontinuity in the input data. A codeword boundary is sequentially correlated with an expected data pattern therefor responsive to detection of the presence of the at least one type of discontinuity.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
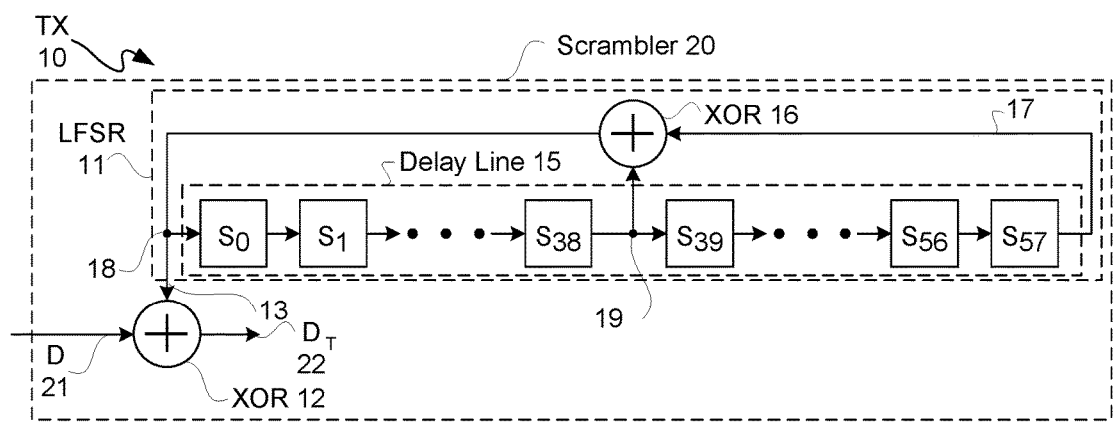
FIG. 1 is a schematic diagram illustratively depicting an exemplary conventional scrambler 20 of a transmitter ("TX").

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A stream of bits may be provided from a transmitter to a receiver over a communication channel. For purposes of clarity by way of example and not limitation, the following description is in terms of a Fibre Channel implementation; however, it shall be appreciated that other forms of data alignment for a communication channel may be used. In Fibre Channel terms, a communication channel may be a "lane", namely a pair of unidirectional transmission media (e.g., fibre, copper, or other wired transmission media) for transmitting in opposite directions and their associated transmitters and receivers in a link of two or more pairs. However, for purposes of clarity by way of example and not limitation, a "single lane" is described below in reference to unidirectional communication from a transmitter to a receiver over a transmission media.

A transmitter-receiver pair for a Fibre Channel single lane conventionally uses common encoding/decoding for forward error correction ("FEC"). Thus, for example, a transmitter may transmit a bitstream over a wired optical or electrical medium, and a receiver may receive and process such bitstream in accordance with a Fibre Channel protocol or specification. Along those lines, a transmitter may convert source words and/or special functions ("source data") into transmission words in accordance with a Fibre Channel protocol or specification and then convert one or more of such transmission words into a bitstream for transmission onto a transmission medium, such as a wired optical or electrical medium. Conversion of source data for Fibre Channel may include transcoding followed by FEC encoding, and then scrambling of such transcoded-FEC coded transmission words into a bitstream. Conversely, at a receiver, a reverse procedure may be used, namely descrambling followed by FEC decoding and then transcoder reconstructing.

For a block-based FEC code, such as a Reed-Solomon ("RS") or other block-based code, a receiver is configured to discover a starting position of a block ("codeword") within a received data stream, such as a bitstream in Fibre Channel. Along those lines, there may be one or more transmission words in a codeword.

Discovery of a starting position of a codeword is generally referred to as alignment or data alignment. Conventionally, for small codewords, all possible starting positions may be tried until a successful decoding occurs. For extra resilience against the possibility of false alignment in such a conventional data alignment process, each codeword may be scrambled by a transmitter with a fixed pattern. Conventionally, this scrambling involves exclusive disjunction ("exclusive-ORing") each codeword with such a fixed pattern by a transmitter, and then a receiver may apply the same exclusive-OR ("XOR") operation with a same or similarly generated fixed pattern to received data. For a Fibre Channel implementation, this fixed pattern may be a pseudo noise binary sequence based on a polynomial function.

For this trial and error data alignment for small codewords, on average, N/2 codewords are received and decoded before alignment is found, where N is the number of bits in one codeword. For some applications, this delay is impractical. In particular, in energy-efficient communication systems, a link, which may include one or more lanes, may be turned off or idled in order to save power. On turning on a link or waking an idled link, alignment may be too slow for some applications. For example for a 32 Gigabit Channel ("32GFC") link with a line rate of approximately 28 Gigabits per second ("Gbps") and a codeword size of 5280 bits, the mean alignment delay may approach approximately 0.5 milliseconds ("ms") for going from an idle state ("sleep") to an active link status ("wake").

For more rapid alignment applications, a receiver may include multiple parallel correlators and a training signal may be used. By rapid alignment, it is generally meant obtaining alignment with a training pattern in approximately less than 1/100th of the mean time to align with respect to a conventional alignment process. While one or more implementations described herein may have an alignment, namely gain lock to a codeword boundary, in approximately a two codeword duration, in other implementations a rapid alignment may have a longer overall alignment duration. Specifically, for a 32GFC specification, a rapid alignment training sequence may be transmitted for alignment in approximately a five (5) codeword duration or less. However, there is a trade-off between number of parallel correlators and mean time for alignment. Along those lines, because data is processed in parallel after deserialization, "real-time" correlation involves checking as many bit positions as there are bits in a parallel data bus, such as for example 66 or 80 bits in parallel. Checking word lengths greater than 60 bits in parallel adds considerable circuitry overhead.

A circuit for rapid detection of codeword boundaries, such as in an RS-FEC-encoded data or other encoded data, is described below in additional detail. Though the following description is for an encoded data stream in a Fibre Channel transmission system, the following description is not limited to a Fibre Channel application, but may be used in reception of any form of transmitted encoded data where a discontinuity is detectable, as described below in additional detail. Detection of a discontinuity allows a receiver to find alignment to an incoming data stream quickly and with only a modicum of additional hardware. In the following example, an alignment delay may be reduced to approximately the duration of two codewords when a training sequence signal is used. In a circuit implementation, a single correlator, a "scoring" block (which may be similar to a correlator), and some control logic may be used in addition to the hardware already used for a conventional trial-and-error implementation. Along those lines, an estimated saving in logic resources may be greater than 90 percent as compared to a conventional correlator-bank implementation for the same alignment delay.

With the above general understanding borne in mind, various configurations for discovering by a receiver a starting position of a block or codeword in a training pattern sent over a communication link, namely alignment, without having to add any alignment marker are generally described below.

FIG. 1 is a schematic diagram illustratively depicting an exemplary conventional scrambler 20 of a transmitter ("TX") 10. For purposes of clarity by way of example and not limitation, a non-limiting example of a 32GFC link is used. Along those lines, the description given below uses specific details associated with implementation of 32GFC link in accordance with a Fibre Channel protocol or specification. However, the following description is equally applicable to any other communication protocol which uses a prearranged training pattern encoded using a block-based FEC with a fixed pseudo-random binary sequence ("PRBS") scrambling pattern applied before transmission. Along those lines, details such as for example transmission line rate, scrambling pattern generator polynomial, FEC codeword length and the equation for FEC parity generation can be varied without departing from the scope of the following description.

Conventionally, a received data stream includes a prearranged training pattern scrambled with a predetermined sequence, such that both a transmitter and a receiver at ends of a communication link may be configured for processing such scrambled training pattern. For a 32GFC link, a binary sequence may be generated by a polynomial function implemented in a linear feedback shift register ("LFSR") 11 of scrambler 20. In the implementation of a 32GFC link for a TX 10, a sequence termed a "PN-5280" sequence may be used. Along those lines, scrambling may be implemented as a modulo 2 addition of an RS-FEC codeword and a pseudo-noise ("PN") sequence of 5280 bits in length. Conventionally, such a PN-5280 bit long sequence is generated from the polynomial $x^58+x^39+1$ with a fixed initial state of alternating ones and zeroes, as known. After 5280 bits, namely generally the length of one RS-FEC codeword, such implementation of a polynomial function is reset to such fixed initial state to cause such PN sequence to recommence at the beginning. Accordingly, such PN sequence is repeated, though with a reset state occurring between neighboring sequences.

LFSR 11 may include a delay line 15 and an exclusive disjunction operator, such as a modulo 2 adder which may be implemented as an exclusive-OR circuit ("XOR") 16. For an exponent P=58 and an exponent Q=39 in the previously described polynomial or polynomial function, delay elements S0 through S57, namely 58 delays, may be used to implement delay line 15 with a tap 19 between delay elements S38 and S39. Output from delay element S38 is provided both as an input to delay element S39 and XOR 16, and output from delay element S57 is provided as another input to XOR 16. A sequence output 13 from XOR 16 is fed back for coupling to an input/output ("I/O") node 18 of LFSR 11 for input to delay element S0 and an XOR 12 of scrambler 20.

An exclusive disjunction for modulo 2 addition is performed by XOR 12 on sequence output 13 of XOR 16 and original data ("D") 21 also input to XOR 12. Thus, LFSR 11 generates a PN-5280 sequence, and XOR 12 applies such sequence in sequence output 13 to original data 21, such as a training pattern, to provide data for transmission ("transmitted data" or "$D_T$") 22.

A modulo 2 operation provided by XORs 16 and 12 used to generate and apply, respectively, a PN sequence for generation of transmitted data 22 is commutative. Using such commutative property, scrambling can in effect be removed by a receiver without prior knowledge of the state of LFSR 11. Along those lines for the example polynomial function, output of LFSR 11 exclusively disjuncted (i.e., XORed) with a copy of itself delayed by 39 positions and XORed with another copy of itself delayed by 58 positions becomes zero. If original data D 21 is XORed with a PN sequence and transmitted as transmitted data 22, data received by a receiver of transmitted data 22 communicated over a communication link thereto may be delayed by corresponding amounts, namely for this example delayed by 39 and 58 positions, to provide copies though correspondingly delayed of such received data. These three copies of such received data may be XORed to remove the effect of scrambler 20. Resulting data from XORing such three copies of such received data, namely data D', may be a linear combination of three delayed copies of original data D 21.

Some of the above-description assumes that scrambler 20 is free-running all the time; however, as previously described, scrambler 20 is periodically reset, which in this example is a reset of scrambler 20 after every 5280 bits, namely after each completed PN sequence. Resetting of scrambler 20 causes XOR operations of XORs 12 and 16 to yield data that contains some remnants of a scrambler state vector. Effectively, resetting of scrambler 20 causes a discontinuity between PN sequences in sequence output 13, where each completed PN sequence is a codeword, and this discontinuity in sequence output 13 can be detected and used to determine position of a codeword boundary for alignment as described below in additional detail.

Figure 2A:
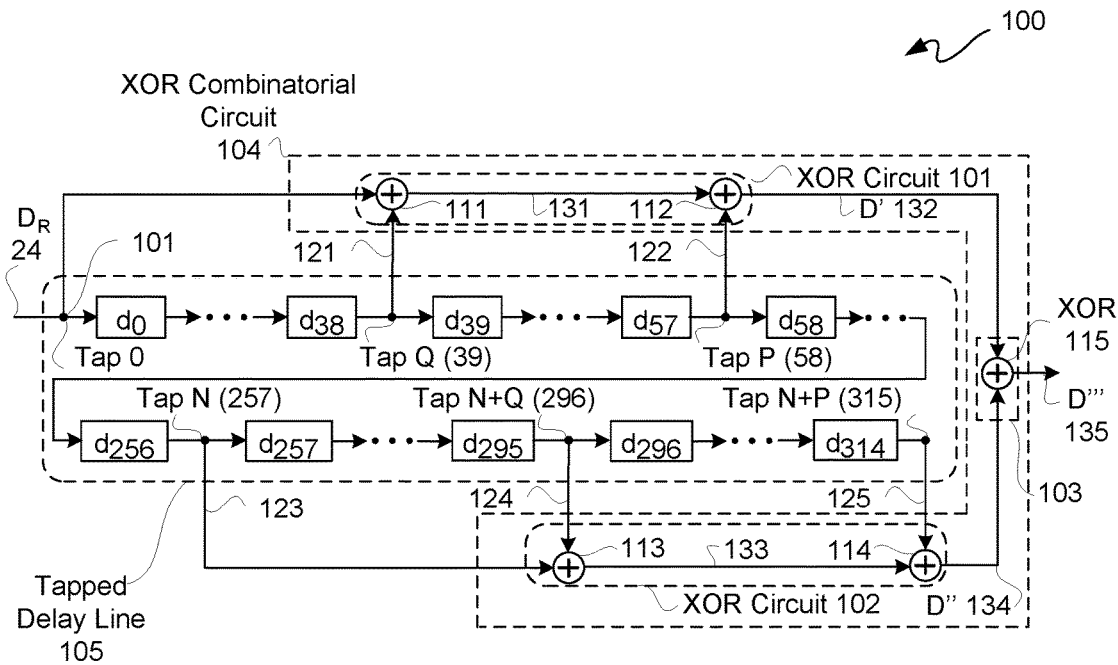
FIG. 2A is a schematic diagram illustratively depicting an exemplary discontinuity detector.

FIG. 2A is a schematic diagram illustratively depicting an exemplary discontinuity detector 100. Discontinuity detector 100 is configured to detect discontinuities in input data, such as received data ("$D_R$") 24. In this example, received data 24 is transmitted data 22 after transmission over a communication link. Again, the non-limiting example of a 32GFC communication link is used for purposes of clarity. Discontinuity detector 100 may include a tapped delay line 105 coupled to an XOR combinatorial circuit 104. XOR combinatorial circuit 104 may be formed of XOR circuits 101 through 103, as described below in additional detail.

Received data 24 includes a training pattern formed of codewords, which in this example are scrambled by a PN-5280 sequence. Received data 24 is received at tap 0, which may also be an I/O node 101, of a tapped delay line 105 of discontinuity detector 100. Tapped delay line 105 for this example includes delay elements d0 through d314 serially coupled to one another. In an implementation, tapped delay line 105, as well as tapped delay line 155 and delay line 156 of FIG. 2B, may be implemented with a clocked shift register ("shift register") for loading and unloading of serial or parallel data. A clock signal is omitted for purposes of clarity and not limitation.

Tapped delay line 105 is configured to receive received data 24 and to provide repetitions 121-125 of received data 24 delayed with respect to one another at taps Q, P, N, N+Q, and N+P, respectively. Such repetitions may be tapped out at delay intervals corresponding to exponent integers Q and P of a polynomial function for a first set, namely repetitions or copies 121 and 122, of such repetitions and to a word length N and word length N respectively added to each of exponent integers Q and P for a second set, namely repetitions or copies 123, 124 and 125, of such repetitions. In this example, Q, P, N, N+Q, and N+P respectively are 39, 58, 257, 296, and 315.

Along the above lines, tapped delay line 105 in addition to tap 0 at I/O node 101 includes tap 39 between delay elements d38 and d39, tap 58 between delay elements d57 and d58, tap 257 between delay elements d256 and d257, tap 296 between delay elements d295 and d296, and an output tap 315 at the end of such chain of delay elements d0 through d314. Taps 0 and 39 and tap 58 are respectively coupled to XOR gates 111 and 112 of an XOR circuit 101. Taps 257 and 296 and tap 315 are respectively coupled to XOR gates 113 and 114 of XOR circuit 102.

A first exclusive-or circuit 101 may be configured to receive received data 24 from I/O node 101 and a set of repetitions 121 and 122 respectively from taps 39 and 58 of tapped delay line 105. Received data 24 and repetition 121 may be input to XOR gate 111 for exclusive disjunction, and an interim result output 131 of XOR gate 111 may be provided as an input to XOR gate 112. Exclusive disjunction of repetition 122 and XOR output 131 by XOR gate 112 may be used to provide a first linear combination for output, namely data D' 132 output from XOR circuit 101. Effectively, XOR circuit 101 successively linearly combines received data 24 and repetitions 121 and 122 to provide a first linear combination. Along those lines, XOR combinatorial circuit 104 may be fully combinatorial throughout so position of taps of tapped delay line 105 need not be altered to compensate for pipeline delays within an XOR circuit. However, in another implementation, delay compensation may be used for a fully pipelined implementation.

This first linear combination, namely data D' 132, may effectively be three superimposed copies of original data 21, apart from noise and discontinuities, which, while data D' 132 will not be equivalent to original data 21, data D' 132 has removed therefrom the effects of LFSR 11, namely removal of a PN pattern imposed by LFSR 11. A same description likewise applies to data D" 134, namely a cancellation of effects of LFSR 11, and data D" 134 will not be equivalent to original data 21. Setting aside noise, parity blocks, and sequence resets, data D' 132 and data D" 134 are equivalent to one another for each repeated word block of a word block length N compared word block-to-word block, where original data 21 is formed of repeated word blocks for providing a training pattern sequence. In other words, for this example, original data 21 is a repeating pattern of period N, which in this example implementation N is 257. Again, setting aside noise, parity blocks, and sequence resets, exclusive disjunction of data D' 132 and data D" 134 effectively results in cancellation, namely a continuous output of zero.

A first set of repetitions, namely repetitions 121 and 122, effectively provide a first delayed version and a second delayed version, respectively, of received data 24 corresponding to a first delay interval of delay elements d0 through d38 and a second delay interval of delay elements d0 through d57 of delay intervals for a first exponent integer Q and a second exponent integer P, respectively, of exponent integers of a polynomial function.

A second exclusive-or circuit 102 may be configured to receive a set of repetitions 123 through 125 respectively from taps 257, 296, and 315 of tapped delay line 105. Repetitions 123 and 124 may be input to XOR gate 113 for exclusive disjunction, and interim result output 133 of XOR gate 113 may be provided as an input to XOR gate 114. Exclusive disjunction of repetition 125 and XOR output 133 by XOR gate 114 may be used to provide a second linear combination for output, namely data D" 134 output from XOR circuit 102. Effectively, XOR circuit 102 successively linearly combines received repetitions 123 through 125 to provide a second linear combination.

A second set of repetitions, namely repetitions 123 through 125, effectively provide a third delayed version, a fourth delayed version and a fifth delayed version of received data 24 respectively corresponding to a third delay interval of delay elements d0 through d256, a fourth delay interval of delay elements d0 through d295, and a fifth delay interval of delay elements d0 through d314 respectively for a word length N, word length N added to first exponent integer Q, and word length N added to second exponent integer P for P greater than Q.

Thus, a single tapped delay line 105 may be configured to receive received data 24 at a tap 0 and provide first through fifth delayed versions, namely repetitions 121 through 125, of received data 24 progressively delayed with respect to one another for a sequence of delay intervals from corresponding taps Q, P, N, N+Q, and N+P of such a single tapped delay line 105. Received data 24 may include n-bit encoded words each of a word length p and groups of these words may be formed into blocks interspersed with m-bit parity blocks for m, n and p respective positive integers. Examples for values of n, m and p for received data 24 may be found in the above-described Working Draft; however, these and/or other examples for values and/or other data configurations of received data 24 may be used.

A third exclusive-or circuit 103, such as may be implemented as an XOR gate 115, may be configured to receive data D' 132 as a first linear combination and data D" 134 as a second linear combination. Data D' 132 and data D" 134 input to an XOR gate 115 for exclusive disjunction of first and second linear combinations with respect to one another may output data D''' 135 as a discontinuity-detection signal, which may be used for detection of a codeword boundary.

As previously stated, the non-limiting example of a 32GFC communication link is used for clarity. For original data 21 being zero, detection of discontinuities between sequences in received data 24 is less difficult than for non-zero original data 21. If original data 21 were zero, then data D' 132 would suffice as a boundary detection signal, because data D' 132 is just three copies of original data 21 linearly combined (i.e., 0 xor 0 xor 0 is 0). Thus, a more complex example than original data 21 being zero is used to further describe operations of discontinuity detector 100.

Assuming original data 21 contains some non-zero data, which may be payload data and/or control data. Examples of control data in a 32GFC system include "IDLE" control words and Low-Power Idle ("LPI") words. In a 32GFC system, either of two repeating patterns in original data 21 can be input for FEC encoding for a training pattern for rapid alignment: one uses IDLE words, and the other uses LPI words. These IDLE/LPI words may undergo a transcoding process, yielding a sequence of 257-bit blocks, which may be input to an RS encoder. Because these blocks repeat every 257 bits, data D' 132 may be XORed with data D''' 134, namely data D''' 134 is a 257-bit delayed version of data D' 132.

Data of data D' 132 and data D''' 134 cancel both original data and scrambling thereof yielding a result of data D''' 135 which is zero everywhere except at each discontinuity, as at each discontinuity data D''' 135 is non-zero. In other words, generally data D''' 135 is formed from an exclusive disjunction of two signals which are themselves just delayed versions of received data 24 apart from discontinuities between codewords. These sequence discontinuities between codewords may include scrambler state vector remnants.

At the end of each FEC codeword of 5280 bits is a block of parity data of m-bits. Parity data for an RS (528, 514) code used in 32GFC is 140 bits long, and therefore differs in length and content from 257-bit blocks of data. This difference causes a second discontinuity in received data 24 data stream prior to a discontinuity due to PN-5280 sequence re-initialization as already described. A parity discontinuity can be detected by a sudden onset of activity in result data D''' 135.

Even though word length N of a word block in this example is 257 bits and a parity block has a block length M of 140 bits, in another implementation N may be less than M. However, it shall be assumed that N>M for the description herein for purposes of clarity and not limitation.

By detecting a parity discontinuity in received data 24 by going from all zeros to some activity in result data D''' 135, a receiver can be configured to capture content in received data 24 responsive to result data D''' 135 indicating such content is within a few bit positions of a codeword boundary. This content may be captured and a sequential correlation operation may be performed on such captured content to determine location of a codeword boundary.

In the presence of line noise (i.e. errors in received data), value of result data D''' 135 may not be exactly zero during a repetitive part of a transmission but may instead contain one or more error pulses. Along those lines, one error pulse on a communication line may cause six error pulses at result data D''' 135 at intervals determined by six delay taps of this implementation of delay line 105. Noise may be addressed by scoring so as not to upset operation in terms of 0-1 and 1-0 error transitions being sufficient in number to falsely indicate a discontinuity.

Figure 2B:
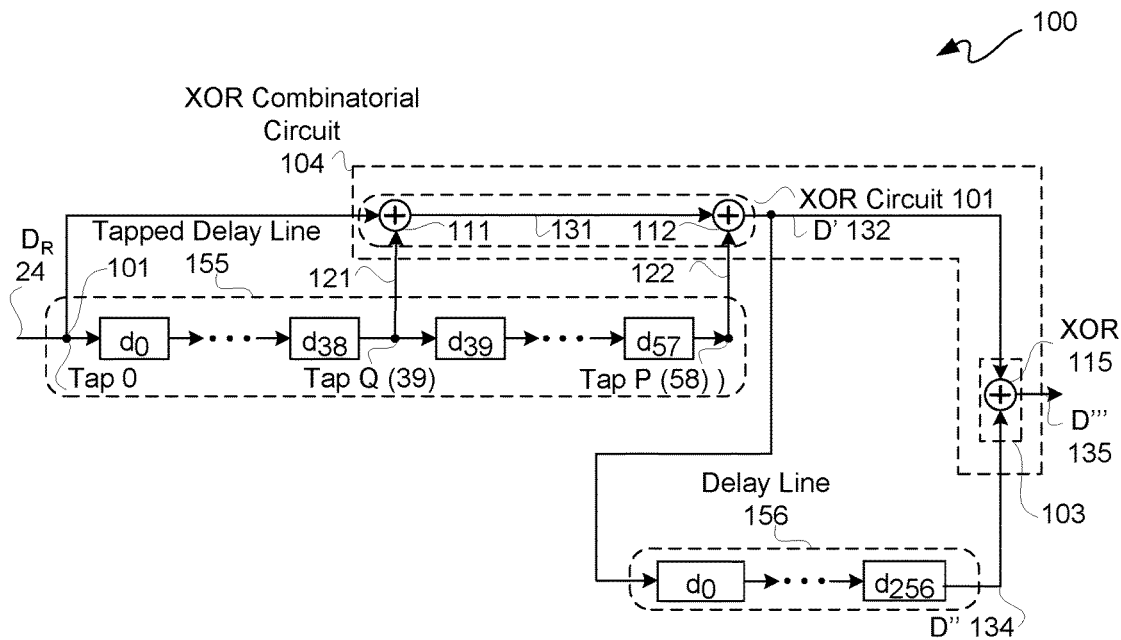
FIG. 2B is a schematic diagram illustratively depicting another exemplary discontinuity detector.

FIG. 2B is a schematic diagram illustratively depicting another exemplary discontinuity detector 100. Discontinuity detector 100 is configured to detect discontinuities in input data, such as received data $D_R$ 24. In this example, received data 24 is again transmitted data 22 after transmission over a communication link. Again, the non-limiting example of a 32GFC communication link is used for purposes of clarity. Discontinuity detector 100 may include a tapped delay line 155 coupled to an XOR combinatorial circuit 104. XOR combinatorial circuit 104 may be formed of XOR circuits 101 through 103, as described below in additional detail.

Received data 24 includes a training pattern formed of codewords, which in this example are PN-5280 sequences. Received data 24 is received at tap 0, which may also be an I/O node 101, of a tapped delay line 155 of discontinuity detector 100. Tapped delay line 155 for this example includes delay elements d0 through d57 serially coupled to one another.

Tapped delay line 155 is configured to receive received data 24 and to provide repetitions 121 and 122 of received data 24 delayed with respect to one another at taps Q and P, respectively. Such repetitions may be tapped out at delay intervals corresponding to exponent integers Q and P of a polynomial function for a set, namely repetitions or copies 121 and 122.

Along the above lines, tapped delay line 155 in addition to tap 0 at I/O node 101 includes tap 39 between delay elements d38 and d39 and tap 58 between delay elements d57 and d58. Taps 0 and 39 and tap 58 are respectively coupled to XOR gates 111 and 112 of an XOR circuit 101.

A first exclusive-or circuit 101 may be configured to receive received data 24 from I/O node 101 and a set of repetitions 121 and 122 respectively from taps 39 and 58 of tapped delay line 155. Received data 24 and repetition 121 may be input to XOR gate 111 for exclusive disjunction, and an interim result output 131 of XOR gate 111 may be provided as an input to XOR gate 112. Exclusive disjunction of repetition 122 and XOR output 131 by XOR gate 112 may be used to provide a first linear combination for output, namely data D' 132 output from XOR circuit 101. Effectively, XOR circuit 101 successively linearly combines received data 24 and repetitions 121 and 122 to provide a first linear combination.

A set of repetitions, namely repetitions 121 and 122, effectively provide a first delayed version and a second delayed version, respectively, of received data 24 corresponding to a first delay interval of delay elements d0 through d38 and a second delay interval of delay elements d0 through d57 of delay intervals for a first exponent integer Q and a second exponent integer P, respectively, of exponent integers of a polynomial function.

A delay line 156 may be configured to receive data D' 132 output. Delay line 156 for this example includes delay elements d0 through d256 serially coupled to one another. A word length N delay for a word block of received data 24 may be provided by delay line 156 to delay data D' 132 to in effect provide a second linear combination for output, namely data D'' 134 output. Delay line 156 provides a delay interval of delay elements d0 through d256 for a word length N, for word length N greater than both P and Q.

A single tapped delay line 155 may be configured to receive received data 24 at a tap 0 and provide first and second delayed versions, namely repetitions 121 and 122, of received data 24 progressively delayed with respect to one another for a sequence of delay intervals from corresponding taps Q and P of such a single tapped delay line 155. Delay line 156 provides an interval of delay of a word length N for words forming a PN sequence, namely a codeword, and this interval of delay may be used for cancelling data D' 132 with data D'' 134 for same word blocks of a sequence, where such word blocks are repeated to provide a training pattern sequence.

Again received data 24 may include n-bit encoded words each of a word length p and groups of these encoded words may be formed into word blocks, and these word blocks may be grouped into a sequence. Parity of a sequence for FEC may be in a parity block, and a parity block may follow a sequence therefor. Accordingly, sequences may be interspersed with M-bit parity blocks for M, n and p respective positive integers. Examples for values of n, M, and p for received data 24 may be found in the above-described Working Draft; however, these and/or other examples for values and/or other data configurations of received data 24 may be used.

A second exclusive-or circuit 103, such as may be implemented as an XOR gate 115, may be configured to receive data D' 132 as a first linear combination and data D'' 134 as a second linear combination. Data D' 132 and data D'' 134 input to an XOR gate 115 for exclusive disjunction of first and second linear combinations with respect to one another may output data D''' 135 as a discontinuity-detection signal, which may be used for detection of a codeword boundary.

As previously stated, the non-limiting example of a 32GFC communication link is used for clarity. Again, for original data 21 being zero, detection of discontinuities between sequences in received data 24 is less difficult than for non-zero original data 21, as delay line 156 and XOR gate 115 would not be used. Thus, a more complex example than original data 21 being zero is used to further describe operations of discontinuity detector 100.

As previously described, assuming original data 21 contains some non-zero data, which may be payload data and/or control data, then delay line 156 and XOR gate 115 are used. Again, examples of control data in a 32GFC system including "IDLE" control words and LPI words are used.

Again, data of data D' 132 and data D'' 134 may cancel both original data and scrambling thereof yielding a result of data D''' 135 which is zero everywhere except at each discontinuity, as at each discontinuity data D''' 135 is non-zero. In other words, generally data D''' 135 is formed from exclusive disjunction of two signals which are themselves just delayed versions of received data 24 apart from discontinuities between codewords. These sequence discontinuities between codewords may include scrambler state vector remnants.

Again, differences in codeword and parity block lengths may cause a second discontinuity in a received data 24 data stream prior to a discontinuity due to a PN-5280 sequence re-initialization already described. This parity discontinuity can be detected by a sudden onset of activity in result data D''' 135.

Again, by detecting a parity discontinuity in received data 24 by going from all zeros to some activity in result data D''' 135, a receiver can be configured to capture content in received data 24 responsive to result data D''' 135 indicating such content is within a few bit positions of a codeword boundary. This content may be captured and a sequential correlation operation may be performed on such captured content to determine location of a codeword boundary.

In the presence of line noise (i.e. errors in received data), value of result data D''' 135 may not be exactly zero during a repetitive part of a transmission but may instead contain one or more error pulses. Along those lines, one error pulse on a communication line may again cause six error pulses at result data D''' 135 at intervals determined by delay taps of this implementation of delay line 155, namely an error in received data 24 is repeated three times for data D' 132 (i.e., one for each tap of delay line 155) and all three repeated error pulses of data D' 132 are repeated again by delay line 156 to give another three error pulses at data D'' 134. Again, noise may be addressed by scoring.

Figure 3:
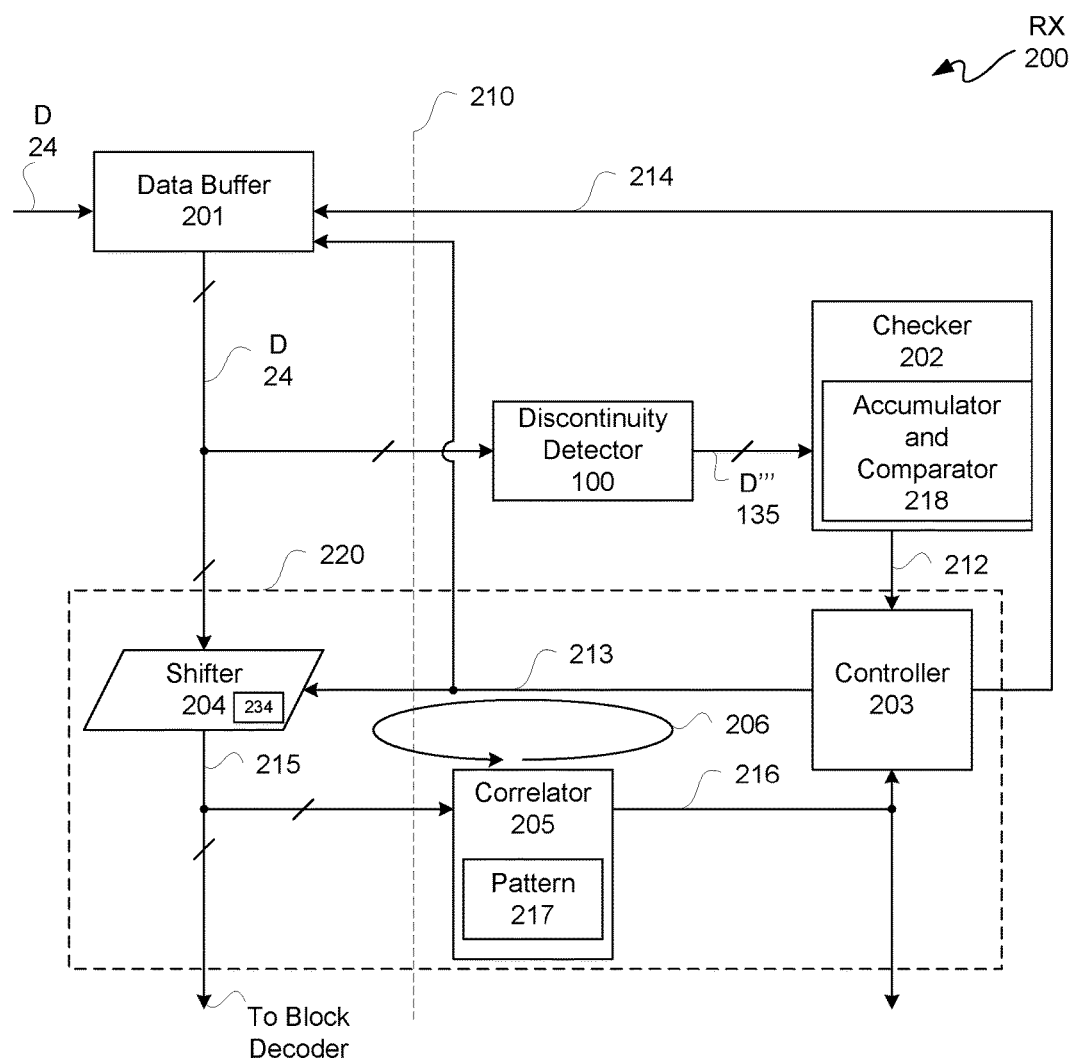
FIG. 3 is a block diagram illustratively depicting an exemplary portion of a receiver ("RX").

FIG. 3 is a block diagram illustratively depicting an exemplary portion of a receiver ("RX") 200. In this example implementation, receiver 200 is for a "single lane" interface in contrast to a multi-lane interface for communication of data over a communication link. For a single lane interface, while there is no lane-to-lane alignment, determining a codeword boundary is used prior to decoding of a block based code. In other words, bit 0, 1, 2, etc., namely where a codeword starts, is determined for alignment for input to a decoder for decoding. An incorrect alignment by being even one bit off from an actual boundary can result in an incorrect decoding.

In this example implementation, receiver 200 includes a data buffer 201, a discontinuity detector 100, a checker circuit ("checker") 202, a control circuit ("controller") 203, a shifter circuit ("shifter") 204, and a correlator circuit ("correlator") 205. Correlator 205 may have stored therein or accessibly thereby one or more patterns, such as pattern 217, for purposes of correlation, namely a portion or all of a PN sequence matching a stored data pattern 217. Again, before a codeword is decoded by a downstream decoder, alignment of such codeword is established.

In the following single lane example, received data 24 need not include any fixed alignment marker for codeword alignment for a single communication link over which such received data 24 is sent. Thus, overhead associated with an alignment marker may be avoided.

Receiver 200 may be for Fibre Channel or other optical link; however, in another implementation, receiver 200 may be for another type of hardwired link. Again, for clarity by way of a non-limiting example, it shall be assumed that a 32GFC link is implemented.

Receiver 200 may be in a sleep mode, and so when a communication link is awaked for awakening receiver 200, receiver 200 may awake in an unknown state with respect to a codeword boundary. Thus, going from a sleep state to an aligned codeword state within a short amount of time, as described herein, and without having to have alignment marker overhead is useful. Moreover, correlation overhead of a receiver for rapid alignment such as called out in the Working Draft for example may be avoided with a modicum of additional circuitry in comparison to conventional correlation overhead. Along those lines, circuitry to the right of dashed line 210 is added to form receiver 200, and circuitry to the left of dashed line 210 is present in a conventional receiver. Thus, only discontinuity detector 100, checker 202, controller 203, and correlator 205 may be added to provide rapid alignment for a receiver 200, and conventional circuitry associated with rapid alignment may be omitted.

Received data 24 may be input to data buffer 201. In an implementation, data buffer 201 may be a shift register or other storage device for temporarily storing and buffering data. Along those lines, data buffer 201 may be a serial-input, parallel output device (SIPO). After buffering by data buffer 201, received data 24 may be output as buffered received data 24 to at least one delay line of a discontinuity detector 100 and to shifter 204. For purposes of clarity by way of a non-limiting example, it shall be assumed that data buffer 201 is a SIPO device, and thus received data 24 output from data buffer 201 is parallel data. Along those lines, for a 32GFC implementation, parallel data may be processed downstream of data buffer 201 in order to accommodate such a high data rate with a frequency of operation of output from data buffer 201 suitable for implementation in an FPGA or other IC.

Parallel received data provided to discontinuity detector 100 is used to provide data D''' 135 as a discontinuity-detection signal. Discontinuity detector 100 may be either discontinuity detector 100 of FIGS. 2A and 2B configured for processing parallel data for this implementation, or for serial data in another implementation.

Recall from the above description, received data 24 includes a training pattern sequence consecutively followed by a parity block for such sequence and then by a re-initialization of a repeat of such training pattern sequence, and that generally data D''' 135 is all logic 0s everywhere except at parity blocks and sequence re-initializations. However, noise in transmission may corrupt received data 24, and thus confirmation of whether logic is were caused by noise or a parity discontinuity and/or a sequence re-initialization discontinuity may be used.

Data D''' 135 may be provided as an input to checker 202. Again, it shall be assumed that received data 24 does not include any fixed markers for codeword alignment for decoding of received data 24. Data D''' 135 is a discontinuity-detection signal, which may be generated for detection of: scrambler state vector remnants indicative of a type of discontinuity due to a sequence re-initialization in received data 24; and/or a parity block at an end of a sequence of repeated sequences in received data 24 indicative of a discontinuity due to a difference between lengths of a word block of a sequence and a parity block for such sequence.

Checker 202 may be configured as an accumulator and comparator 218 to score data D''' 135 for a data window of received data 24. An accumulated count may be thought of as a score. In other words, data D''' 135 may be scored to determine within a data window whether such score indicates a coarse probability of the onset of a discontinuity or not. The exact scoring system may vary from system-to-system. For this implementation, checker 202 may be configured to count the number of bits that are logic 1 within a data window of at least one parallel word length or width Z output from data buffer 201. However, in another implementation, checker 202 may be configured to: count the number of bits that are logic 1 in a data window, count the number of transitions in a data window, compare a resulting count for a data window against a score for the immediately previous data window, or some combination of these.

A score thus obtained can be compared against a threshold, such as by a comparator, by checker 202 to decide whether a correlation operation should be performed on currently captured data as indicated by such score. Generally, checker 202 may be thought of as a coarse probability check used to qualify whether a more rigorous process, namely a correlation, should be invoked.

If a score for data D''' 135 for a data window is below a threshold, as may vary from application-to-application, then checker 202 may be configured to not assert discontinuity-detected signal 212. If, however, a score for data D''' 135 for a data window is equal to or above a threshold, as may vary from application-to-application, then checker 202 may be configured to assert discontinuity-detected signal 212.

Checker 202 may be configured to receive data D''' 135 as a discontinuity-detection signal to check for at least one type of discontinuity between codewords in received data 24 responsive to such a discontinuity-detection signal for a data window and to assert a discontinuity-detected signal 212 responsive to an indication of presence of such at least one type of discontinuity, namely a sequence re-initialization discontinuity and/or a parity block discontinuity. In this example, a data window for checker 202 spans both types of discontinuities. However, in another implementation, a check for either of these types of discontinuities may be used.

If for example checker 202 is deceived and thus falsely asserts a discontinuity-detected signal 212, correlation with correlation loop 206 will fail and receiver 200 can try again to locate the upcoming discontinuity. However, if checker 202 correctly asserts discontinuity-detected signal 212 responsive to a score of data D''' 135 within a data window for example, controller 203 may be configured to receive such discontinuity-detected signal 212 and to assert both a shift control signal 213 and a suspend signal 214 responsive to assertion of received discontinuity-detected signal 212.

Controller 203 may be coupled to provide suspend signal 214 and shift control signal 213 to data buffer 201 to cause data buffer 201 to temporarily suspend normal output of received data 24 from data buffer 201 and to shift received data in data buffer 201 suspected of including a codeword boundary into shifter 204. Because an alignment delay may be reduced to approximately the duration of two codewords when a training pattern signal is used, suspension of output from data buffer 201 may be sufficiently short such that current buffer sizes may be used without additional overhead. However, in another implementation, size of data buffer 201 may be increased to accommodate rapid alignment as described herein.

Again, received data 24 includes a training pattern sequence consecutively followed by a parity block for such sequence and then by a re-initialization of a repeat of such training pattern sequence, so assertion of suspend signal 214 may be timely for capturing a codeword boundary in shifter 204. In other words, when suspend signal 214 is asserted, a discontinuity may be in shifter 204 of a sequential correlator 220, and thus a codeword boundary may be in shifter 204.

Shifter 204 may be implemented as a logical shifter or other type of shifter for shifting bits in shifter 204 responsive to shift control signal 213 for alignment. Shifter 204 may be configured to receive shift control signal 213 from controller 203 to cause bits stored in shifter 204 to be shifted responsive to assertion of shift control signal 213. Effectively, shift control signal 213 may instruct shifter 204 to shift a distance, namely a number of bits, to shift received data 24 in order to produce shifted output data ("shifted data") 215. Such shifted bits in shifter 204 may be output as shifted data 215 to correlator 205.

Correlator 205 may be configured to receive and correlate shifted data 215 with a data pattern 217. Correlator 205 may be configured to compare shifted data 215 with data pattern 217 for an exact or a partial match ("match"). Along those lines, some systems may be more or less tolerant to noise, and accordingly the degree of a match may vary from application-to-application. If a match is not found, correlator 205 may be configured to not assert match signal 216.

Controller 203 may be configured to receive match signal 216, asserted or not, from correlator 205. If match signal 216 is not asserted, controller 203 may continue to assert shift control signal 213 to cause data in data buffer 201 and shifter 204 to sequentially shift data until a match is found or a timed-out condition occurs.

If a match is found between shifted data 215 and data pattern 217, namely an expected data pattern, correlator 205 may be configured to assert match signal 216. In response to assertion of match signal 216, controller 203 may be configured to de-assert both shift control signal 213 and suspend signal 214 to resume normal flowing of received data from data buffer 201 through shifter 204 downstream and to a tapped delay line of discontinuity detector 100. Optionally, received data 24 output from data buffer 201 may be provided downstream on separate parallel data busses, namely one path that passes through shifter 204 and one path that does not pass through shifter 204, where a decoder has a separate port for receiving an aligned codeword 234 from shifter 204.

Accordingly, if a match is found, an alignment condition is provided with data in shifter 204, namely aligned codeword 234, and an aligned codeword 234 output from shifter 204 may be provided downstream to a block decoder for decoding, such as an RS-FEC decoder (not shown). Along those lines, match signal 216 may optionally be provided downstream to such a block decoder for activation of decoding.

Controller 203, shifter 204, and correlator 205 may be coupled in a feedback correlation loop 206 configured to iteratively shift received data 24 in shifter 204 until such received data shifted matches an expected data pattern 217 of correlator 205. Accordingly, this sequential correlation provided by controller 203, shifter 204, and correlator 205 coupled in a feedback correlation loop 206 may be considered a sequential correlator 220 for rapid alignment acquisition in an optical, or wired, communication system.

Figure 4:
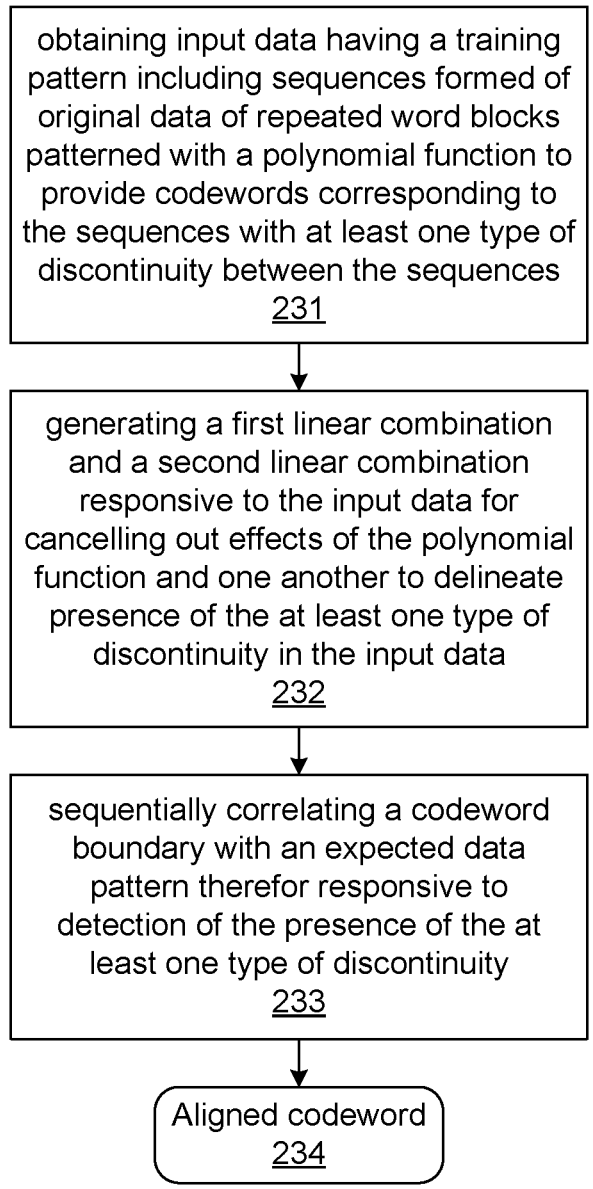
FIG. 4 is a flow diagram depicting an exemplary alignment flow for a receiver, such as the receiver of FIG. 3.

FIG. 4 is a flow diagram depicting an exemplary alignment flow 230 for a receiver, such as receiver 200 of FIG. 3. At 231, input data, such as received data 24, is obtained. Again, received data 24 has a training pattern including sequences formed of repeated word blocks patterned with a polynomial function to provide codewords corresponding to such sequences with at least one type of discontinuity between such sequences. Again, such a training pattern further includes: parity blocks corresponding to and consecutively following such sequences; and re-initialization remnants consecutively leading all but an initial one of such sequences. Such training pattern does not include any alignment markers for correlation of a codeword boundary.

At 232, a first linear combination and a second linear combination, such as data D' 132 and D'' 134 respectively, are generated responsive to received data 24. Such first and second linear combinations are for cancelling out effects of an LFSR polynomial function and cancelling out one another, as previously described, to delineate presence of at least one type of discontinuity, such as a sequence re-initialization or parity block discontinuity, in received data 24 as previously described. At 233, sequential correlation, such as with sequential correlator 220, is performed to find a codeword boundary matching an expected data pattern therefor responsive to detection of the presence of at least one type of discontinuity. Along those lines, an aligned codeword 234 may be output corresponding to obtaining a match, exact or partial as may vary from application-to-application as previously described.

Figure 5:
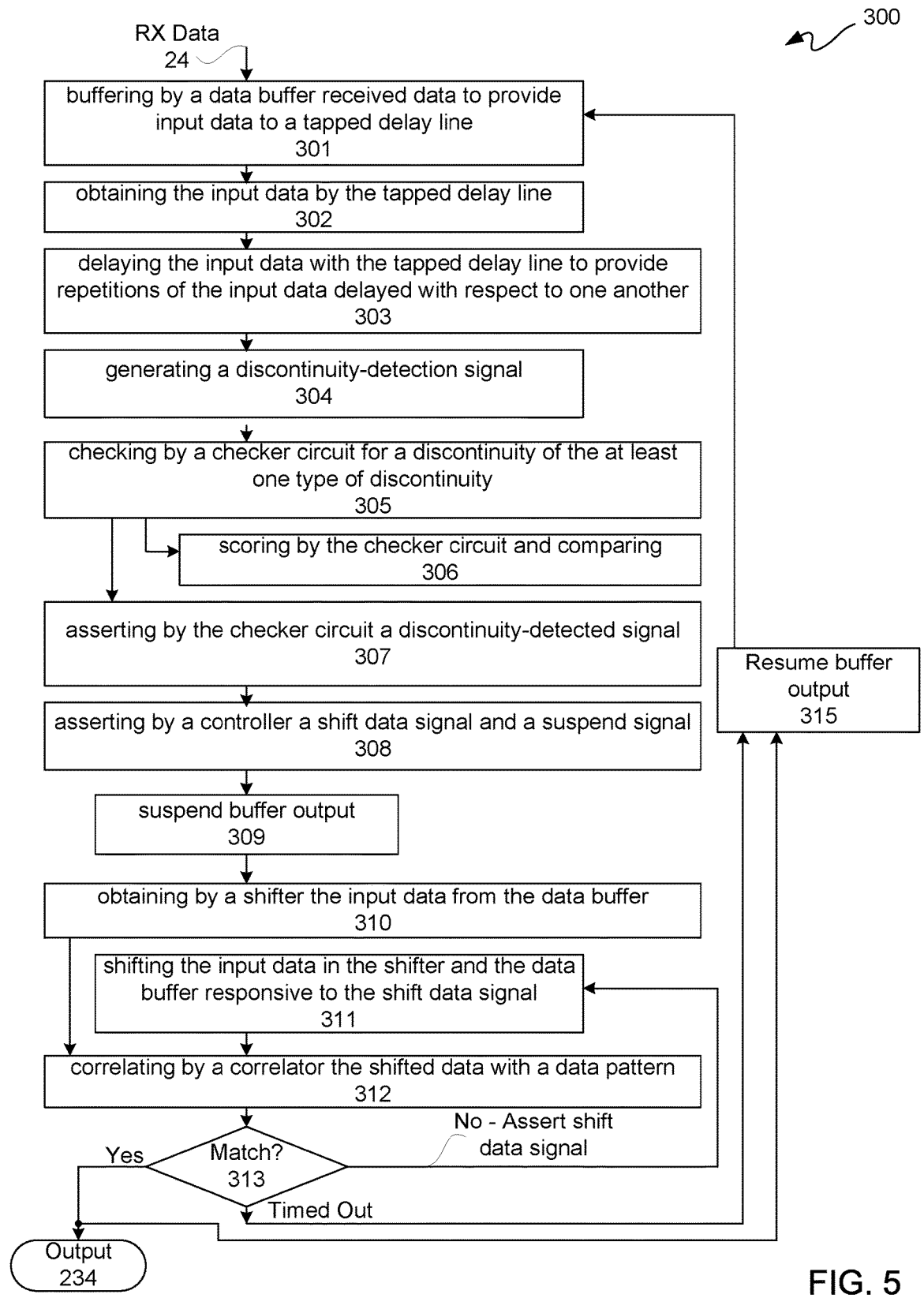
FIG. 5 is a flow diagram illustratively depicting an exemplary alignment flow, such as for the alignment flow of FIG. 4.

FIG. 5 is a flow diagram illustratively depicting an exemplary alignment flow 300, which may be used to provide one or more of the operations of alignment flow 230 of FIG. 4 for receiver 200 of FIG. 3. At 301, a data buffer 201 receives and buffers received data 24 to provide input data 24 to a tapped delay line 105 or 155. At 302, input data 24 is obtained by such a tapped delay line 105 or 155, and at 303 such input data 24 is delayed by such a tapped delay line 105 or 155 to provide repetitions of input data 24 delayed with respect to one another, as previously described. At 304, a discontinuity-detection signal 135 may be generated.

Figure 6A:
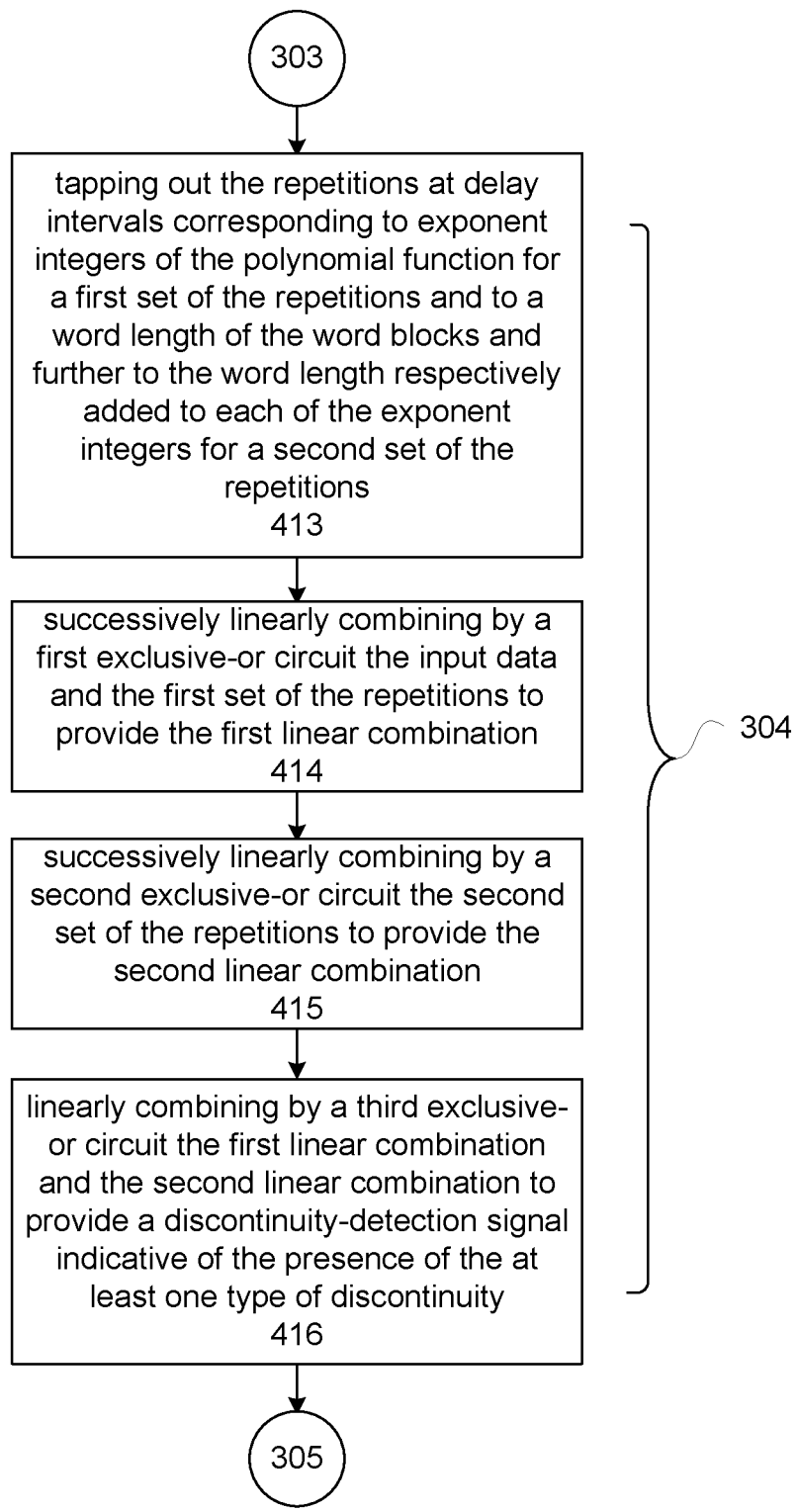
FIG. 6A is a flow diagram illustratively depicting an exemplary discontinuity-detection signal generation flow for an operation of the alignment flow of FIG. 5 for the discontinuity detector of FIG. 2A.

FIG. 6A is a flow diagram illustratively depicting an exemplary discontinuity-detection signal 135 generation flow for operation 304 of FIG. 5 for discontinuity detector 100 of FIG. 2A. At 413, tapped out from a tapped delay line 105 are repetitions at delay intervals corresponding to exponent integers of a polynomial function for a first set of the repetitions and to a word length of word blocks of received data 24 and further to the word length respectively added to each of the exponent integers for a second set of the repetitions.

At 414, a first exclusive-or circuit 101 is used to successively linearly combine received data 24 and such first set of the repetitions to provide a first linear combination, namely data D' 132. At 415, a second exclusive-or circuit 102 is used to successively linearly combine such second set of the repetitions to provide a second linear combination, namely data D'' 134. At 416, a third exclusive-or circuit 103 is used to linearly combine such first and second linear combinations to provide a discontinuity-detection signal, namely data D''' 135, indicative of the presence of at least one type of discontinuity in shifter 204 or data buffer 201.

Figure 6B:
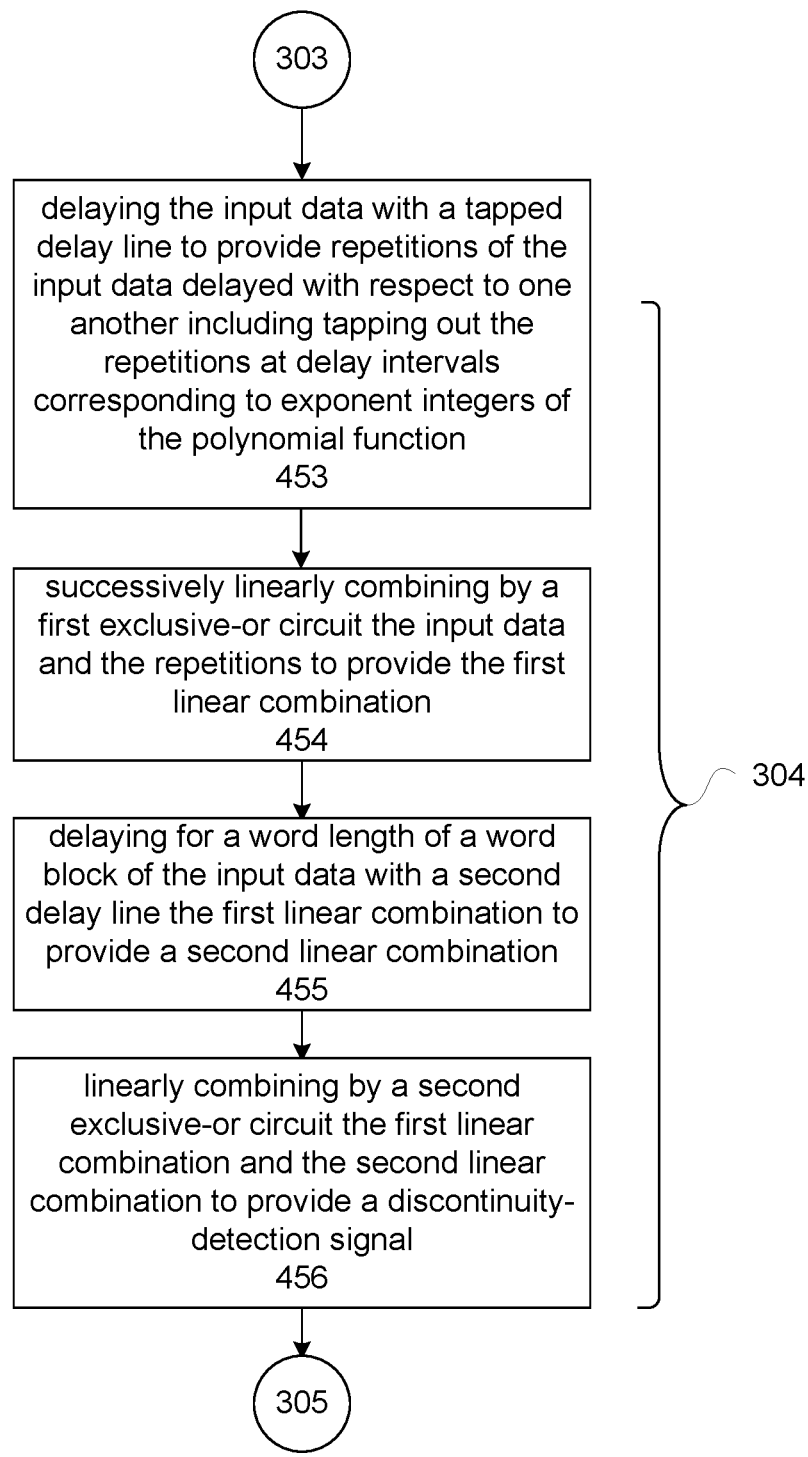
FIG. 6B is a flow diagram illustratively depicting an exemplary discontinuity-detection signal generation flow for an operation of the alignment flow of FIG. 5 for the discontinuity detector of FIG. 2B.

FIG. 6B is a flow diagram illustratively depicting an exemplary discontinuity-detection signal 135 generation flow for operation 304 of FIG. 5 for discontinuity detector 100 of FIG. 2B. At 453, input data 24 is delayed with a tapped delay line 155 to provide repetitions 121 and 122 of such input data delayed with respect to one another. Such repetitions 121 and 122 are tapped out at delay intervals corresponding to exponent integers of a polynomial function.

At 454, a first exclusive-or circuit is used to successively linearly combine such input data and repetitions 121 and 122 to provide a first linear combination, namely data D' 132. At 455, word blocks of input data 24 are delayed for a word length thereof with a second delay line 156 such first linear combination to provide a second linear combination, namely data D''134. At 456, a second exclusive-or circuit 103 is used to linearly combine such first and second linear combinations to provide a discontinuity-detection signal, namely data D''' 135, indicative of the presence of at least one type of discontinuity in shifter 204 or data buffer 201.

Returning to FIG. 5, at 305, a checker 202 checks for a discontinuity of at least one type of discontinuity between sequences, such as codewords, of received data 24 responsive to discontinuity-detection signal, namely data D''' 135. This checking at 305 may include checker 202 at 306 scoring such discontinuity-detection signal and comparing such score against a threshold value, as previously described. If such score is less than such threshold value, then a discontinuity-detected signal is not assert. However, if such score is equal to or greater than such threshold value, then at 307 checker 202 asserts a discontinuity-detected signal 212 responsive to such a score of one or more discontinuity-detection signals, such as an accumulation thereof over a data window as previously described for example.

At 308, responsive to assertion of a discontinuity-detected signal 212, a controller 203 may assert a shift control signal 213 and a suspend signal 214 responsive to assertion of discontinuity-detected signal 212. Assertion of suspend signal 214 at 308 by controller 203 may cause data buffer 201 to temporarily suspend normal operation of output of received data 24 at 309.

Assertion of discontinuity-detected signal 212 may trigger on detection of a parity block and/or a sequence re-initialization in received data 24, and so such one or more discontinuities may have been output from data buffer 201 into shifter 204. In this instance, a codeword boundary immediately following such a parity block and sequence re-initialization may be in data buffer 201.

Along those lines, a shifter 204 may obtain all or a portion of received data stored in data buffer 201 at 310, where such data obtained from data buffer 201 includes a codeword boundary. Optionally, suspend signal 214 and/or shift control signal 213 may be used for controlled release of received data in data buffer 201 into shifter 204. For example, for a SIPO configured as a first-in, first-out buffer for data buffer 201, received data in data buffer 201 at a bottom of a data stack thereof may be shifted out of data buffer 201 while shifting out discontinuity data in shifter 204 responsive to assertion of shift control signal 213 for subsequent correlation with data anew shifted into shifter 204.

At 312, such received data obtained from data buffer 201 into shifter 204 at 310 may be shifted out of shifter 204 for correlation by a correlator 205 for comparison to a data pattern 217. If a match is found at 313 as between such a data pattern 217 and received data shifted out of shifter 204, namely shifted data 215, then such aligned codeword 234 to a codeword boundary output from shifter 204 may be provided downstream to a decoder along with assertion of match signal 216 by correlator 205. Responsive to assertion of match signal 216, controller 203 may de-assert shift control signal 213, as well as suspend signal 214 as described below in additional detail.

However, if a match is not found at 313, then at 311 received data may be shifted in and out of shifter 204 responsive to a shift control signal 213, namely shifting out current received data in shifter 204 and shifting in later received data from data buffer 201 into shifter 204. Shift control signal 213, as well as suspend signal 214, may be held asserted at 313 by correlator 205 responsive to de-assertion of match signal 216 indicating that a match was not found at 313.

After providing shifted data 215 by causing shifter 204 to shift received data 24 therein at 311, correlator 205 may attempt correlation with such shifted data 215 at 312 with data pattern 217. This loop may iteratively repeat until a match is found or until a timed out condition occurs after a number of failed attempts to match, which number may vary from application-to-application.

However, as previously described for rapid alignment within approximately two codewords, if no match is found after a third attempt, then a timed-out condition may be asserted by controller 203 responsive to continued de-assertion of match signal 216. After finding a match or timing out, at 315 normal output of received data 24 from data buffer 201 may resume by de-asserting suspend signal 214 at 315 and resuming providing received data 24 to a tapped delay line at 301.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 7:
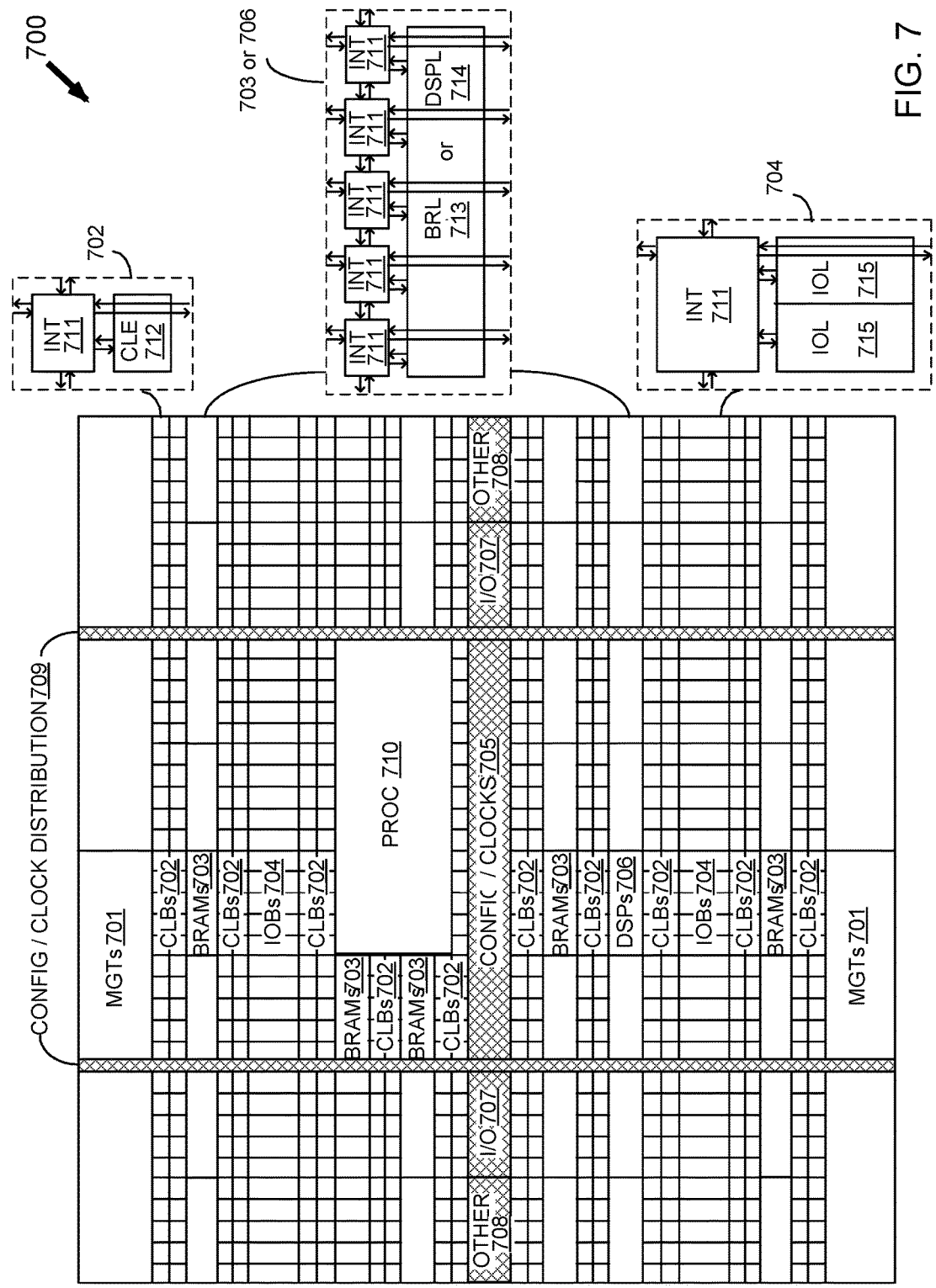
FIG. 7 is a simplified block diagram depicting an exemplary columnar Field Programmable Gate Array ("FPGA") architecture.

As noted above, advanced FPGAs can include several different types of programmable logic blocks in the array. For example, FIG. 7 illustrates an FPGA architecture 700 that includes a large number of different programmable tiles including multi-gigabit transceivers ("MGTs") 701, configurable logic blocks ("CLBs") 702, random access memory blocks ("BRAMs") 703, input/output blocks ("IOBs") 704, configuration and clocking logic ("CONFIG/CLOCKS") 705, digital signal processing blocks ("DSPs") 706, specialized input/output blocks ("I/O") 707 (e.g., configuration ports and clock ports), and other programmable logic 708 such as digital clock managers, analog-to-digital converters, system monitoring logic, and so forth. Some FPGAs also include dedicated processor blocks ("PROC") 710.

In some FPGAs, each programmable tile includes a programmable interconnect element ("INT") 711 having standardized connections to and from a corresponding interconnect element in each adjacent tile. Therefore, the programmable interconnect elements taken together implement the programmable interconnect structure for the illustrated FPGA. The programmable interconnect element 711 also includes the connections to and from the programmable logic element within the same tile, as shown by the examples included at the top of FIG. 7.

For example, a CLB 702 can include a configurable logic element ("CLE") 712 that can be programmed to implement user logic plus a single programmable interconnect element ("INT") 711. A BRAM 703 can include a BRAM logic element ("BRL") 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element ("DSPL") 714 in addition to an appropriate number of programmable interconnect elements. An IOB 704 can include, for example, two instances of an input/output logic element ("IOL") 715 in addition to one instance of the programmable interconnect element 711. As will be clear to those of skill in the art, the actual I/O pads connected, for example, to the I/O logic element 715 typically are not confined to the area of the input/output logic element 715.

In the pictured embodiment, a horizontal area near the center of the die (shown in FIG. 7) is used for configuration, clock, and other control logic. Vertical columns 709 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, processor block 710 spans several columns of CLBs and BRAMs.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for a receiver, comprising:
at least one delay line configured to receive input data from a communication lane and provide repetitions of the input data delayed with respect to one another, the input data including repeated sequences; and
an exclusive disjunction combinatorial circuit configured to receive the input data and the repetitions thereof and to generate a discontinuity-detection signal for codeword alignment responsive to successive linear combination by exclusive disjunction of the input data and the respectively delayed repetitions thereof to cancel out portions of the repeated sequences of the input data for detection of at least one type of discontinuity in the input data;
wherein the discontinuity-detection signal is generated for detection of a parity block at an end of a sequence of the repeated sequences in the input data indicative of the at least one type of discontinuity due to a difference between lengths of a word block of the sequence and the parity block.

2. The apparatus according to claim 1, wherein the input data does not include any fixed markers for codeword alignment for decoding of the input data.

3. The apparatus according to claim 1, wherein the discontinuity-detection signal is generated further for detection of scrambler state vector remnants indicative of the at least one type of discontinuity due to a sequence re-initialization between the repeated sequences in the input data.

4. The apparatus according to claim 1, wherein:
the at least one delay line is a tapped delay line configured to receive the input data and to provide the repetitions of the input data delayed with respect to one another;
the repetitions are tapped out from the tapped delay line at delay intervals corresponding to exponent integers of a polynomial function for a first set of the repetitions and to a word length of a word block and the word length respectively added to each of the exponent integers for a second set of the repetitions; and
the exclusive disjunction combinatorial circuit comprises:
a first exclusive-or circuit configured to receive the input data and the first set of the repetitions and to successively linearly combine the input data and the first set of the repetitions to provide a first linear combination;
a second exclusive-or circuit configured to receive the second set of the repetitions and to successively linearly combine the second set of the repetitions to provide a second linear combination; and
a third exclusive-or circuit configured to receive the first linear combination and the second linear combination and to linearly combine the first linear combination and the second linear combination by exclusive disjunction to provide the discontinuity-detection signal.

5. The apparatus according to claim 1, wherein:
a first set of the repetitions comprises a first delayed version and a second delayed version of the input data respectively corresponding to a first delay interval and a second delay interval of the delay intervals for a first exponent integer and a second exponent integer, respectively, of the exponent integers of a polynomial function; and a second set of the repetitions comprises a third delayed version, a fourth delayed version, and a fifth delayed version of the input data respectively corresponding to a third delay interval, a fourth delay interval, and a fifth delay interval of the delay intervals for a word length, the word length added to the first exponent integer, and the word length added to the second exponent integer, respectively.

6. The apparatus according to claim 5, wherein:
the input data includes N-bit encoded blocks each of the word length repeated to provide a sequence of the repeated sequences in the input data;
the polynomial function includes an exponent P for P the first exponent integer and an exponent Q for Q the second exponent integer for P greater than Q; and
the discontinuity-detection signal includes scrambler state vector remnants from between the sequences of the repeated sequences in the input data.

7. The apparatus according to claim 1, wherein:
the at least one delay line is a first delay line and a second delay line;
the first delay line is configured to receive the input data and tap out the repetitions of the input data delayed with respect to one another corresponding to exponent integers of a polynomial function;
the exclusive disjunction combinatorial circuit comprises a first exclusive-or circuit configured to receive the input data and the repetitions and to successively linearly combine the input data and the repetitions to provide a first linear combination;
the second delay line is configured to receive the first linear combination and to delay the first linear combination for a word length of the word block to provide a second linear combination; and
the exclusive disjunction combinatorial circuit comprises a second exclusive-or circuit configured to receive the first linear combination and the second linear combination and to linearly combine the first linear combination and the second linear combination by exclusive disjunction to provide the discontinuity-detection signal.

8. The apparatus according to claim 7, wherein the repetitions comprise a first delayed version and a second delayed version of the input data respectively corresponding to a first delay interval and a second delay interval of the delay intervals for a first exponent integer and a second exponent integer, respectively, of the exponent integers of the polynomial function.

9. The apparatus according to claim 8, wherein:
the input data includes N-bit encoded blocks each of the word length repeated to provide a sequence of the repeated sequences in the input data;
the polynomial function includes an exponent P for P the first exponent integer and an exponent Q for Q the second exponent integer for P greater than Q; and
the discontinuity-detection signal includes scrambler state vector remnants from between the repeated sequences of the input data.

10. A system for a receiver, comprising:
at least one delay line configured to receive input data from a communication lane and provide repetitions of the input data delayed with respect to one another, the input data including repeated sequences;
an exclusive disjunction combinatorial circuit configured to receive the input data and the repetitions thereof and to generate a discontinuity-detection signal for codeword alignment responsive to successive linear combination by exclusive disjunction of the input data and the repetitions thereof to cancel out portions of the repeated sequences of the input data for detection of at least one type of discontinuity;

a checker circuit configured to receive the discontinuity-detection signal, to check for the at least one type of discontinuity between the repeated sequences of the input data responsive to the discontinuity-detection signal, and to assert a discontinuity-detected signal responsive to indication of presence of the at least one type of discontinuity;

a data buffer configured to receive and buffer the input data to provide the input data to the at least one delay line;

a control circuit configured to receive the discontinuity-detected signal and to assert a shift control signal and a suspend signal responsive to the discontinuity-detected signal;

a shifter circuit configured to receive the input data and the shift control signal and to shift the input data responsive to the shift control signal to provide shifted data; and a correlator circuit configured to receive and correlate the shifted data with a data pattern;

wherein the discontinuity-detection signal is generated for detection of a parity block at an end of a sequence of the repeated sequences in the input data indicative of the at least one type of discontinuity due to a difference between lengths of a word block of the sequence and the parity block.

11. The system according to claim 10, wherein the controller circuit, the shifter circuit, and the correlator circuit are coupled in a feedback loop configured to iteratively shift the input data by the shifter until a correlation with the data pattern for a sequential correlation.

12. A method for a receiver, comprising:

obtaining, using at least one tapped data line, input data including repeated sequences comprising a training pattern including sequences formed of original data of repeated word blocks patterned with a polynomial function to provide codewords corresponding to the sequences with at least one type of discontinuity between the sequences;

generating, from the at least one tapped data line, a first linear combination and a second linear combination responsive to the input data for cancelling out effects of the polynomial function and cancelling out portions of one another to delineate presence of the at least one type of discontinuity in the input data;

generating a discontinuity-detection signal upon the delineation of the presence of the at least one type of discontinuity, wherein the discontinuity-detection signal is generated for detection of a parity block at an end of a sequence of the repeated sequences in the input data indicative of the at least one type of discontinuity due to a difference between lengths of a word block of the sequence and the parity block; and repeatedly correlating, at a checker circuit, a codeword boundary with an expected data pattern therefor responsive to detection of the presence of the at least one type of discontinuity.

13. The method according to claim 12, wherein:
the training pattern further includes:
parity blocks corresponding to and consecutively following the sequences; and
re-initialization remnants consecutively leading all but an initial one of the sequences; and the training pattern does not include any alignment markers for correlation of the codeword boundary.

14. The method according to claim 12, wherein the generation of the discontinuity-detection signal comprises:

delaying the input data with the at least one tapped delay line to provide repetitions of the input data delayed with respect to one another;

tapping out the repetitions at delay intervals corresponding to exponent integers of the polynomial function for a first set of the repetitions and to a word length of the repeated word blocks and further to the word length respectively added to each of the exponent integers for a second set of the repetitions;

successively linearly combining by a first exclusive-or circuit the input data and the first set of the repetitions to provide the first linear combination;

successively linearly combining by a second exclusive-or circuit the second set of the repetitions to provide the second linear combination; and linearly combining by a third exclusive-or circuit the first linear combination and the second linear combination to provide the discontinuity-detection signal indicative of the presence of the at least one type of discontinuity.

15. The method according to claim 14, further comprising:

checking by the checker circuit for a discontinuity of the at least one type of discontinuity between the sequences of the input data responsive to the discontinuity-detection signal;

scoring by the checker circuit the discontinuity-detection signal; and asserting by the checker circuit a discontinuity-detected signal responsive to a score associated with the discontinuity-detection signal being greater than a threshold.

16. The method according to claim 15, further comprising:

buffering by a data buffer received data to provide the input data to the tapped delay line;

asserting by a controller a shift control signal and a suspend signal responsive to assertion of the discontinuity-detected signal;

obtaining by a shifter the input data from the data buffer;

shifting the input data in the shifter responsive to the shift control signal to provide shifted data; and correlating by a correlator the shifted data with the expected data pattern.

17. The method according to claim 12, wherein the generation of the discontinuity-detection signal comprises:

delaying the input data with the at least one tapped delay line to provide repetitions of the input data delayed with respect to one another including tapping out the repetitions at delay intervals corresponding to exponent integers of the polynomial function;

successively linearly combining by a first exclusive-or circuit the input data and the repetitions to provide the first linear combination;

delaying for a word length of the word blocks with a second delay line the first linear combination to provide the second linear combination; and linearly combining by a second exclusive-or circuit the first linear combination and the second linear combination to provide the discontinuity-detection signal.

18. The method according to claim 17, further comprising:

checking by the checker circuit for a discontinuity of the at least one type of discontinuity between the sequences of the input data responsive to the discontinuity-detection signal;

scoring by the checker circuit the discontinuity-detection signal; and asserting by the checker circuit a discontinuity-detected signal responsive to a score of the discontinuity-detection signal greater than a threshold number therefor.

19. The method according to claim 18, further comprising:

buffering by a data buffer received data to provide the input data to the tapped delay line;

asserting by a controller a shift control signal and a suspend signal responsive to assertion of the discontinuity-detected signal;

obtaining by a shifter the input data from the data buffer;

shifting the input data in the shifter responsive to the shift control signal to provide shifted data; and correlating by a correlator the shifted data with the expected data pattern.

\* \* \* \* \*